United States Patent
Asada

[19]

[11] Patent Number: 6,158,323
[45] Date of Patent: Dec. 12, 2000

[54] DISK CUTTER

[75] Inventor: Tanehiko Asada, Iwata-gun, Japan

[73] Assignee: Tenryu Seikyo Kabushiki Kaisha, Shizuoka, Japan

[21] Appl. No.: 09/172,886

[22] Filed: Oct. 15, 1998

[51] Int. Cl.[7] .......................... B27B 33/08; B23D 61/02
[52] U.S. Cl. ........................ 83/835; 83/676; 83/838
[58] Field of Search .......................... 83/835, 676, 663, 83/838

[56] References Cited

U.S. PATENT DOCUMENTS 3,812,755  5/1974  Danielsen ........................ 83/835
5,090,287  2/1992  Chezem ........................... 83/838

Primary Examiner—Lee Young
Assistant Examiner—Rick Kiltae Chang
Attorney, Agent, or Firm—Arent Fox Kintner Plotkin & Kahn PLLC

[57] ABSTRACT

A disk cutter has an annular disk-shaped base which is composed of a first disk and a second disk spot-welded at a plurality of portions to the first disk. Each of the first and second disks has a plurality of holes formed therein. The holes are circumferentially spaced at an equal interval with the holes of the first and second disks being alternately arranged. The base has a peripheral edge with a plurality of tool receiving recesses formed therein. A plurality of hardened cutting tool inserts are fixed to the base at the recesses.

5 Claims, 5 Drawing Sheets

DISK CUTTER

BACKGROUND OF THE INVENTION

1. Field of the Invention

This invention relates generally to a disk cutter, and more particularly to a disk cutter of the low noise type which has two base disks welded to each other and facilitates distinction from disk cutters of ordinary types.

2. Description of the Related Art

A disk cutter composed of a base disk which has a plurality of recesses formed in an outer circumferential edge thereof and has hardened cutting chip inserts (cutter inserts) individually fixed in the recesses by brazing or the like is popularly used. The base disk has a plurality of recesses spaced at a predetermined interval in a circumferential direction, and the hardened cutter inserts have shank portions which are received in and fixed to the recesses by brazing or the like.

One of problems of such a disk cutter as described above resides in that resonance vibrations occur in a particular condition upon cutting operation or upon idling and great noise is generated. Ill effects of noise are well known and tend to be considered as a progressively serious matter in recent years. A principle of attenuating vibrations by forming a disk cutter from a plurality of base disks placed one on another and joined together in place of a single base disk in order to cope with the problem of noise described above is known. Disk cutters which attenuate noise based on the above principle are put on the market.

By the way, when such a disk cutter as described above is sold in a "Do it yourself" shop or a specialty store, it is sold in almost all cases in a form that it is accommodated in such a package 2 as shown in FIG. 1. Referring to FIG. 1, a disk cutter 4 is accommodated in a package 2 composed of a card board 6 and a transparent plastic cover 8 and is displayed by threading a hanger or the like of the shop through a hole 7 formed in the card board 6. Since such a display method as just described is usually taken, a purchaser looks at the disk cutter 4 accommodated in the package 2 in a plane and consequently cannot discriminate readily whether the disk cutter 4 is a disk cutter of the low noise type composed of two base disks placed one on the other and joined together or a disk cutter of an ordinary type composed of a single base disk. This gives rise to a problem that a user sometimes purchases a wrong disk cutter.

SUMMARY OF THE INVENTION

Accordingly, it is an object of the present invention to provide a disk cutter of the low noise type which has two base disks and facilitates distinction thereof from a disk cutter of an ordinary type.

In accordance with an aspect of the present invention, there is provided a disk cutter comprising an annular disk-shaped base adapted to be driven about an axis of rotation, the base including a first disk and a second disk spot-welded at a plurality of portions to the first disk, the first and second disks having a common diameter, the first and second disks each having at least one hole formed therein, the base having a peripheral edge with a plurality of tool receiving recesses formed therein, and a plurality of hardened cutting tool inserts fixed to the base at the recesses, each cutting tool insert having a cutting edge and a shank portion received in a respective one of the recesses.

Preferably, the first and second disks each has a plurality of holes formed therein, the holes being circumferentially spaced at an equal interval with holes of the first and second disks alternately arranged. Preferably, bottoms of the holes are painted in color different from that of the base disk.

Since the disk cutter of the present invention is constructed such that the two base disks each has at least one hole formed at different locations from each other in such a manner as to allow easy distinction, a purchaser can discriminate a disk cutter of an ordinary type from the disk cutter of the low noise type composed of two base disks placed one on the other joined together readily from each other. Consequently, the problem that a wrong disk cutter may possibly be purchased can be eliminated.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
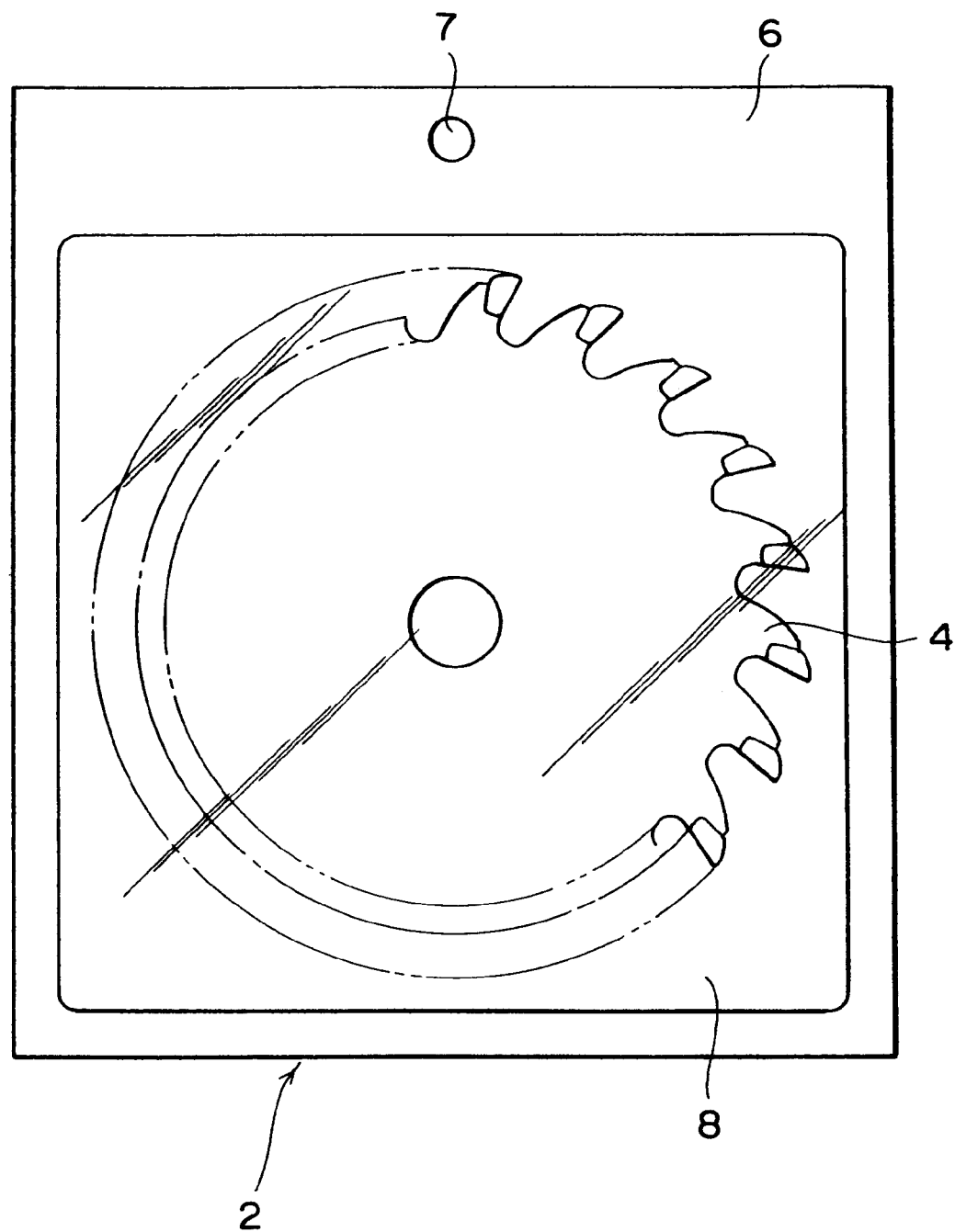
FIG. 1 is a side elevational view of a conventional disk cutter in a condition wherein it is accommodated in a package.
Figure 2:
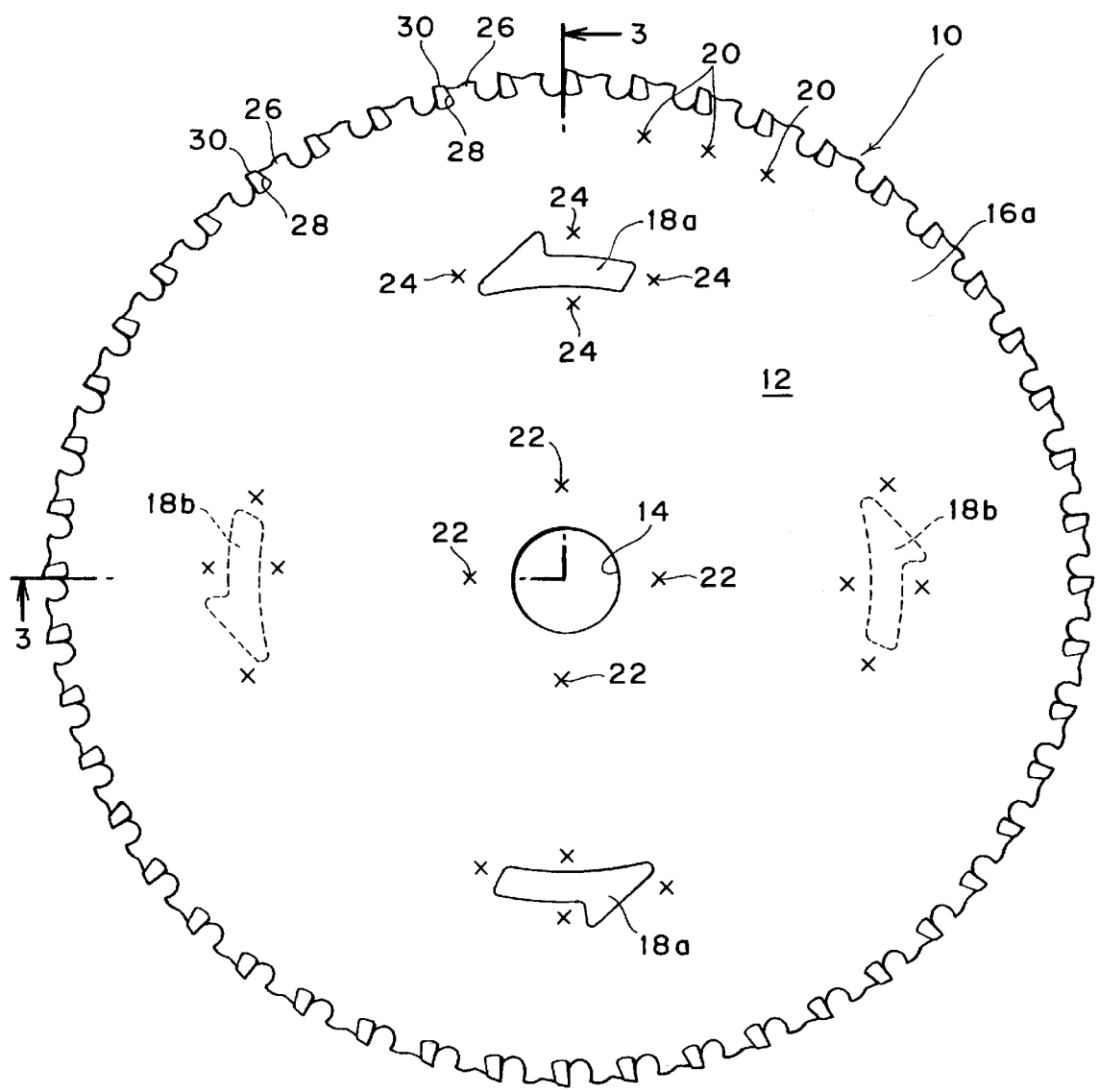
FIG. 2 is a side elevational view of a disk cutter of a first embodiment of the present invention.
Figure 3:
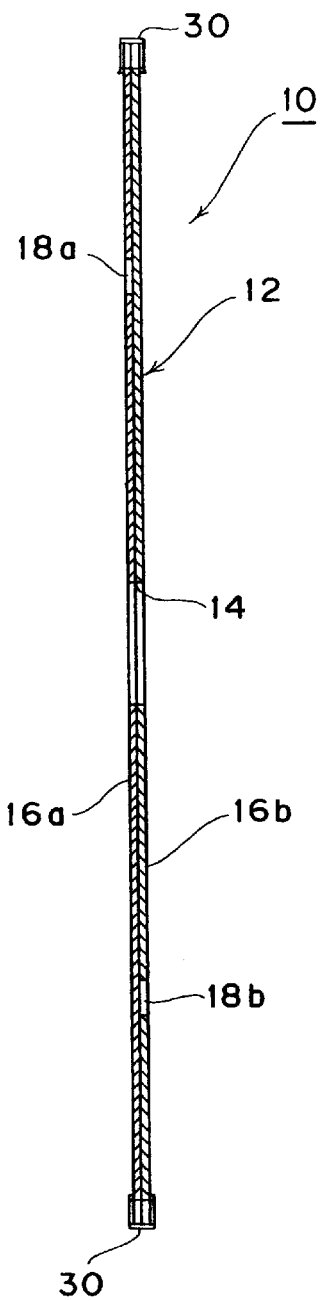
FIG. 3 is a sectional view taken along line 3—3 of FIG. 2.
Figure 4:
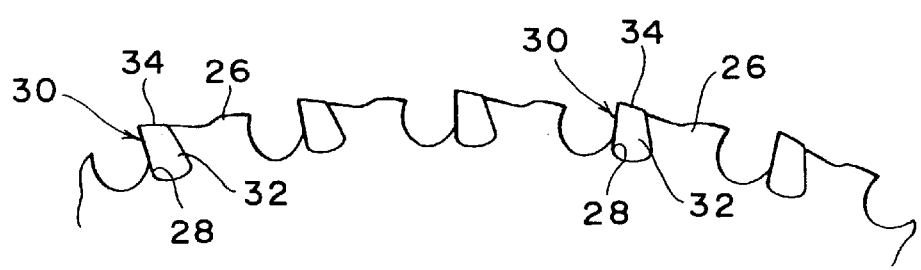
FIG. 4 is a partial enlarged view of a circumferential edge portion of the disk cutter.

Referring to FIG. 2, there is shown a side elevational view of a disk cutter 10 of a first embodiment of the present invention. FIG. 3 is a sectional view taken along line 3—3 of FIG. 2. A base disk 12 has a mounting hole 14 at the center thereof and is mounted onto a tool such as a lawn mower by attaching the mounting hole 14 to a shaft of the tool. The base disk 12 is assembled by spot-welding a first disk 16a and a second disk 16b at a plurality of portions. The disks 16a and 16b are made of a steel such as JIS SKS51 (alloy tool steel) or JIS SK5 (carbon tool steel).

The first disk 16a has two arrow-shaped holes 18a formed therein symmetrically with respect to the center thereof. Similarly, also the second disk 16b has two arrow-shaped holes 18b formed therein symmetrically with respect to the center thereof. The first disk 16a and the second disk 16b are placed one on the other such that the holes 18a and 18b formed therein are disposed substantially 90 degrees off from each other in a circumferential direction, and are spot-welded to each other at a plurality of portions 20, 22 and 24. In particularly, 48 spot-welded portions 20 are provided at circumferential edge portions; four spot-welded portions 22 are provided around the mounting hole 14; and four spot-welded portions 24 are provided around each of the arrow-shaped holes 18a and 18b. Consequently, the first disk 16a and the second disk 16b are spot-welded to each other at 68 portions.

The quantity and the locations of the spot-welded portions are important to achieve a noise reduction effect, and if the quantity of spot-welded portions is excessively large, then the rigidity becomes so high that the disks act as a disk cutter composed of a single disk, and consequently, resonance becomes more likely to occur and little noise reduction effect is achieved. On the other hand, if the quantity of spot-welded portions is excessively small, then the first disk 16*a* and the second disk 16*b* are less likely to contact with each other, resulting in formation of an air layer therebetween, and consequently, the noise reduction effect is degraded. In the present embodiment, since the holes 18*a* and 18*b* have an arrow shape indicating the direction of rotation of the disk cutter 10, when the disk cutter 10 is mounted onto a tool, wrong mounting of the disk cutter 10 with the front and rear surfaces reversed is prevented.

A plurality of chip supports 26 are formed at an equal pitch interval on an outer circumferential edge of the base disk 12. Each of the chip supports 26 has a recess or a groove 28 formed therein for receiving a hardened cutter insert (cutting chip insert) 30. The recess 28 tapers inwardly in a radially outward direction. The cutter insert 30 is made of a very hard material such as cemented carbide of JIS K10, K20 or the like. The cutter insert 30 has a shank portion 32 and a cutting edge 34 (cutting chip portions), and the shank portion 32 is inserted in the recess 28 and brazed to the recess 28 with silver solder or the like.

Preferably, the bottom of each of the holes 18*a* and 18*b* is painted. The painting color may be any color only if it is different from the color of the base disk 12, preferably an apparently striking color.

The process of production of the disk cutter 10 of the present embodiment is generally as follows. First, suitable quenching and annealing are performed for the two disks 16*a* and 16*b*. Then, locally perforating operation is performed to form the holes 18*a* and 18*b* in the disks 16*a* and 16*b*, respectively. Then, the relative positions of the two disks 16*a* and 16*b* are adjusted, and spot-welding is performed at a plurality of portions for the disks 16*a* and 16*b* to integrate the two disks each other. Then, annealing is performed for the welded portions, and the bottoms of the holes 18*a* and 18*b* are painted if necessary. The painting of the holes is performed optionally and may not necessarily be performed. Then, surface polishing is performed for the base disk 12, and working of the chip supports 26 is performed, whereafter the cutter inserts 30 are brazed in the recesses 28.

With the disk cutter 10 of the present embodiment, since the holes 18*a* and 18*b* whose bottoms are painted are formed in the two disks 16*a* and 16*b* placed one on the other and joined together, a purchaser can identify readily that the disk cutter 10 is a disk cutter of the low noise type which is composed of two disks placed one on the other and joined together. Consequently, purchasing of a disk cutter based on wrong recognition between a disk cutter of an ordinary type and a disk cutter of the low noise type is prevented.

Figure 5:
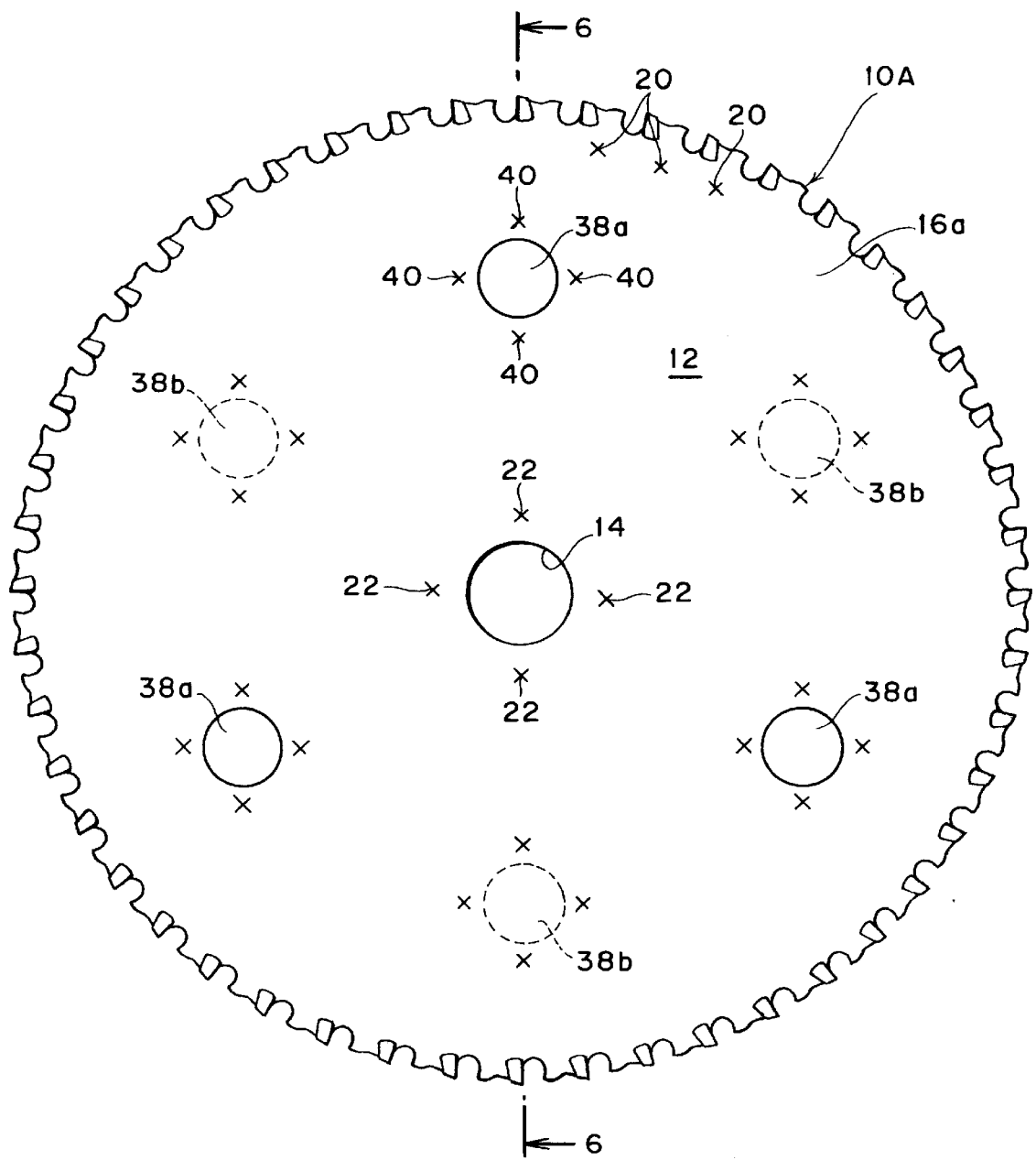
FIG. 5 is a side elevational view of a disk cutter of a second embodiment of the present invention.
Figure 6:
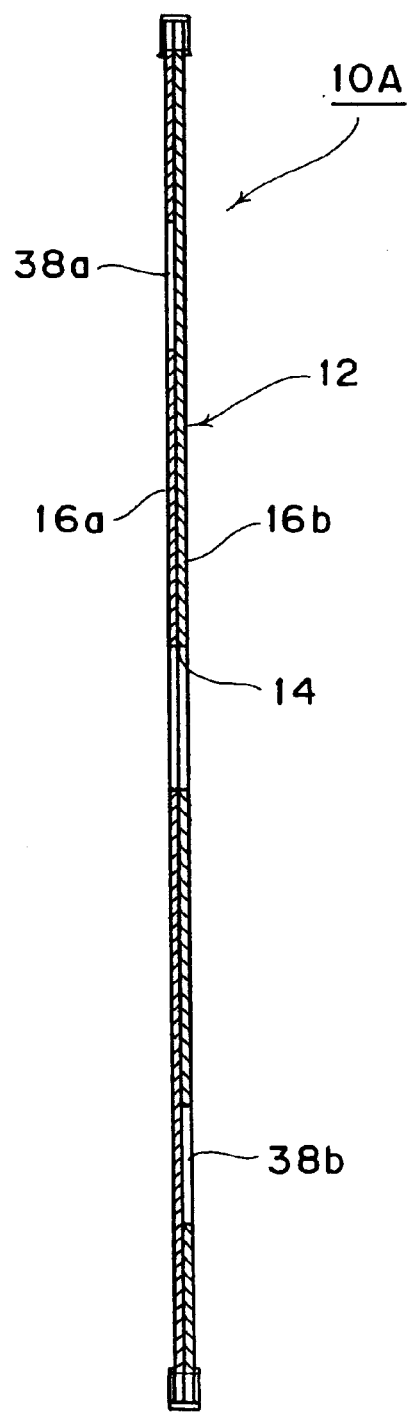
FIG. 6 is a sectional view taken along line 6—6 of FIG. 5.

Referring now to FIG. 5, there is shown a side elevational view of a disk cutter 10A of a second embodiment of the present invention. FIG. 6 is a sectional view taken along line 6—6 of FIG. 5. In FIGS. 5 and 6, like elements to those of the first embodiment are denoted by like reference numerals, and overlapping description of them is omitted here to avoid redundancy.

In the present embodiment, the first disk 16*a* has three holes 38*a* spaced by 120 degrees from each other in a circumferential direction, and the second disk 16*b* has three holes 38*b* spaced by 120 degrees from each other in a circumferential direction. The first disk 16*a* and the second disk 16*b* are spot-welded to each other at totaling 76 points 20, 22 and 40 while the relative positions thereof are adjusted such that each adjacent holes 38*a* and 38*b* are spaced by 60 degrees from each other in a circumferential direction. In particular, the first disk 16*a* and the second disk 16*b* are spot-welded at four points 40 around each of the holes 38*a* and 38*b*. The spot-welded portions on the outer circumferential edge of the base disk 12 and around the mounting hole 14 are similar to those in the first embodiment described hereinabove.

Also in the present embodiment, preferably the bottom of each of the holes 38*a* and 38*b* is painted in a color different from the color of the base disk 12. Consequently, when purchased, the disk cutter 10A of the low noise type can be identified readily from a disk cutter of an ordinary type.

Where the balance is taken into consideration, the holes 18*a* and 18*b* in the first embodiment are preferably disposed at an equal interval on the same circumference, and also the holes 38*a* and 38*b* in the second embodiment are preferably disposed at an equal interval on the same circumference. However, the present invention is not limited to the embodiments shown in the drawings, and for the identification function, the number of holes may be one or more on each of the opposite sides of the base disk, or some other disposing method may be taken.

What is claimed is:

1. A disk cutter comprising:

an annular disk-shaped base adapted to be driven about an axis of rotation, said base including a planar first disk and a planar second disk spot-welded at a plurality of portions to said first disk, wherein said first disk includes at least one hole formed therein through which can be seen one or more portions of a planar surface of said second disk and said second disk includes at least one hole formed therein through which can be seen one or more portions of a planar surface of said first disk, said first and second disks having a common diameter, said base having a peripheral edge with a plurality of tool receiving recesses formed therein; and a plurality of hardened cutting tool inserts fixed to said base at the recesses, each cutting tool insert having a cutting edge and a shank portion received in a respective one of said recesses.

2. The disk cutter according to claim 1, wherein said first and second disks each has a plurality of holes formed therein, said holes being circumferentially spaced at an equal interval and said holes of the first disk are arranged substantially 90° offset in a circumferential direction from the holes of the second disk.

3. The disk cutter according to claim 2, wherein each recess tapers inwardly in a radially outward direction and the shank portion of each of said cutting tool inserts is shaped complementary to said recesses.

4. The disk cutter according to claim 2, wherein said one or more portions of said planar surface of said second disk and said one or more portions of said planar surface of said first disk are painted in a color different from an exterior surface of said base.

5. The disk cutter according to claim 1, wherein said one or more portions of said planar surface of said second disk and said one or more portions said planar surface of said first disk are painted in a color different from an exterior surface of said base.

* * * * *